June 23, 1931.  F. E. LANGDON  1,811,237
COLLAPSIBLE WINDING SHAFT
Filed Feb. 10, 1930
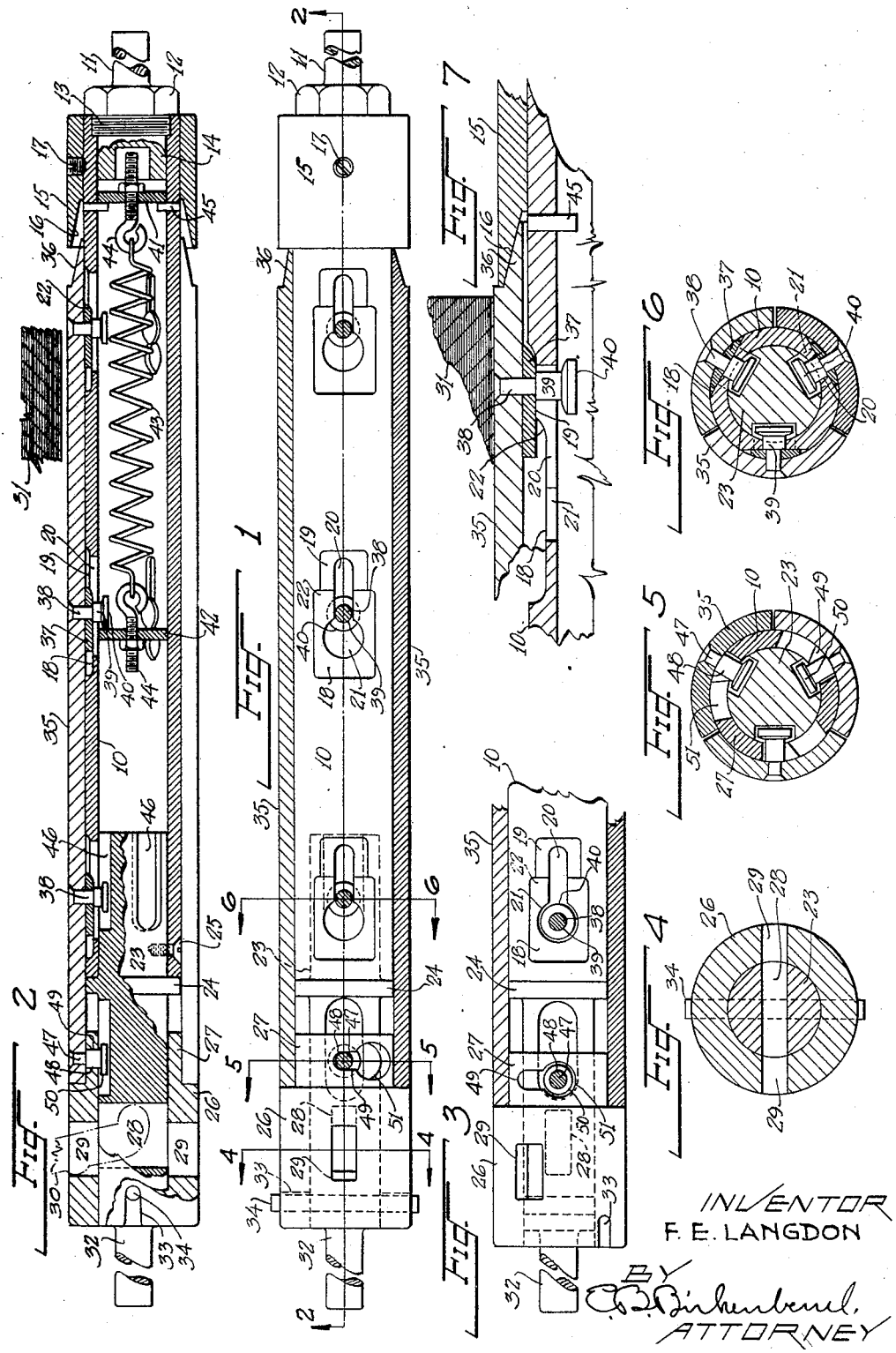
INVENTOR
F. E. LANGDON
ATTORNEY Patented June 23, 1931

1,811,237

UNITED STATES PATENT OFFICE

FRANK E. LANGDON, OF VANCOUVER, WASHINGTON

COLLAPSIBLE WINDING SHAFT

Application filed February 10, 1930. Serial No. 427,141.

This invention relates generally to the paper making industry, and particularly to shafts upon which paper is rolled as it comes from the paper-making machine.

The main object of this invention is to provide an improved form of winding shaft which will be simple to manufacture, easy to assemble and take apart, and which will have an increased length of paper supporting area as compared with the shaft described in my United States Patent Number 1,631,538.

The second object is to provide an improved form of lock for the expansible sides of the shaft.

These, and other objects, will become more apparent from the specification following as illustrated in the accompanying drawings, in which:

Figure 1 is a longitudinal section through the outer plates showing the remainder of the shaft in elevation.

Figure 2 is a section taken along the line 2—2 in Figure 1.

Figure 3 is a fragmentary view showing the locking pin removed for the purpose of taking the shaft apart.

Figure 4 is a section taken along the line 4—4 in Figure 1.

Figure 5 is a section taken along the line 5—5 in Figure 1.

Figure 6 is a section taken along the line 6—6 in Figure 1.

Figure 7 is a section through an expanded jaw end.

Similar numbers of reference refer to similar parts throughout the several views.

Referring in detail to the drawings, there is shown a central sleeve 10 into one end of which is threaded a shank 11 which forms a shaft end. The shank 11 is provided with a hexagonal portion 12 by means of which its threaded portion 13 can be securely tightened within the sleeve 10. The shank 11 is also provided with a stub end 14 which fits closely into the interior of the sleeve 10. Around the same end of the sleeve 10 to which is secured the shank 11 is fastened a collar 15 provided with an undercut sloping face 16 on the side away from the shank 11. The collar 15 is secured to the sleeve 10 by means of the set screw 17.

Along the length of the sleeve 10 are formed the flattened faces 18 and 19 through which pass the keyhole slots 20 whose enlarged end 21 lies within the flattened area 18. The flattened face 19 is somewhat raised with relation to the face 18, the connecting surface 22 forming an incline.

In the opposite end of the sleeve 10 is inserted a plug 23 provided near its middle with a shoulder 24 which engages the end of the sleeve 10. The plug 23 is secured to the sleeve 10 by means of the screw 25.

Rotatably mounted on the plug 23 outside of its shoulder 24 is a collar 26 whose portion 27 is reduced to the outside diameter of the sleeve 10. The plug 23 is provided with a bar slot 28, and the collar 26 is provided with the corresponding slots 29. A bar 30 is pushed through the slots 28 and 29 for the purpose of retracting the expansible members about to be described to the position shown in Figure 2, namely that in which the plug is withdrawn from the roll 31. The plug 23 is also provided with a shank 32 similar to the shank 11 and for the same purpose.

The collar 26 is provided with the end slots 33 through which extends a pin 34 which, in turn, passes through the plug 23. The function of the slots 33 and the pin 34 is to permit a limited longitudinal movement between the plug 23 and the collar 26. The collar 26 is of the same external diameter as is the collar 15.

Surrounding the sleeve 10 are three arcuate jaws 35 whose ends 36 are tapered to correspond with the face 16. Against the concave side of each jaw 35 is secured a cam 37 by means of the double headed rivet 38 whose innermost head 39 can pass freely along a slot 20 and whose outermost head 40 is sufficiently small to permit same to pass through the opening 21.

Within the sleeve 10 are the washers 41 and 42 between which is stretched a spring 43 whose ends are attached to the washers 41 and 42 by means of the eye bolts 44. The washer 41 bears against the pins 45 in the sleeve 10. The washer 42 bears against the head 40 of the rivet 38.

The plug 23 is provided with elongated slots 46 to accommodate its respective rivets 38. The end of each jaw 35 nearest the collar 26 has secured on the inner side a double headed rivet 47 whose head 48 passes freely through a transverse keyhole slot 49 into the reduced portion 27 of the collar 26, and the head 50 of the rivet 47 can pass through the enlarged portion of the keyhole slot 49.

The operation of the device is as follows: To assemble same it is necessary to place the three jaws 35 in position around the sleeve 10 allowing the rivet head 40 to pass through the openings 21 and then sliding the jaw longitudinally toward the collar 15, in which position they are prevented from separating from the sleeve 10, and one end thereof is securely held against outward movement by the collar 15. When placing the various jaws in position each rivet head 50 is passed through its respective opening in the collar portion 27. The washers 41 and 42, together with the spring 43, are of course also placed in position.

The next movement is to rotate the collar 26 with relation to the plug 23 until the pin 34 can be inserted (as shown in Fig. 1). This partial rotation of the collar 26 has brought the keyhole slot 49 and the rivet portion 48 into the relation shown in Fig. 1. It can be seen that as long as the pin 34 is in place that it will be impossible to remove any of the jaws 35, nor is it necessary that they should be removed except for repairs, in which event it is necessary to first remove the pin 34.

By this construction I have not only overcome the difficulty of assembling and taking apart the winding shaft described in my previously mentioned patent, but I have also increased the length of its expansible portion and simplified the construction thereof.

I claim:

1. A collapsible winding shaft having in combination a tubular core, a plurality of arcuate jaws surrounding said core and slidably mounted thereon, wedge means between said jaws and core for moving said jaws radially as they slide longitudinally, spring means for urging said jaws to an expanded position, a slidable collar attached to all of said jaws having means for exerting a leverage between same and said tubular core, said slidable collar being normally nonrotatable with relation to said core, the fastening between said collar and jaws consisting of a rivet and keyhole connection whereby a rotary movement of said collar will permit a separation of said jaws and tubular core, and removable pin means for permitting the rotation of said collar with relation to said tubular core.

2. In a collapsible winding shaft the combination of a tubular core having longitudinal keyhole slots formed in the surface thereof, a plurality of arcuate jaws having inwardly projecting double headed rivets occupying said keyhole slots, one head of each rivet passing slidably in the small portion of said slot and the other head passing freely through the enlarged portion of the slot, each of said jaws having an inwardly projecting rivet secured to one end thereof, a collar normally slidably attached to said tubular core, said collar having a plurality of keyhole slots formed around the periphery thereof normal to said tube, slots adapted to receive the end rivets of the jaws, and a pin for slidably and nonrotatably uniting said tube and collar whereby when said pin is withdrawn said collar is free to rotate with relation to said jaws in a manner that the jaws may be moved radially away from said core.

3. In a collapsible winding shaft the combination of an elongated central core having an undercut collar at one end thereof, a plurality of stepped cam surfaces formed along the sides thereof, each of said surfaces having a keyhole slot formed therein longitudinal with said core, a plurality of longitudinal arcuate jaws surrounding said core, each of said jaws having a number of double headed rivets mounted on the inner side thereof one head of said rivet being passable through the enlarged portion of said keyhole slot and the other head being slidable in the narrow portion of the key-hole slot, said rivets constituting a means for holding said jaws loosely against the side of the tube and permitting a limited radial movement of said jaws, a spring urging said jaws toward said collar, a wedge on each of said rivets adapted to ride on said cam faces in a manner to move said jaw outwardly under the action of said spring and to hold same outward positively by means of said cam, all of said jaws being nonrotatable with relation to said core, a slidable collar attached to said core having a reduced end portion equal in diameter to said core and upon which one end of said jaws can overlap, said reduced collar portion having circumferential keyhole slots formed therein one for each jaw, each overlapping jaw portion having a rivet on its inner side whose head extends into said collar keyhole slot, a pin passing through said collar and core normally permitting a slidable movement between these parts limiting the travel of the double head rivets to the narrow portions of their respective slots, said pin when withdrawn permitting a rotary movement of said collar and also a slidable movement thereof whereby said double headed rivets can move to the enlarged portion of their respective slots and permit the separation of said jaws and core.

FRANK E. LANGDON.